United States Patent
Carreras Garcia

(10) Patent No.: US 9,832,542 B2
(45) Date of Patent: Nov. 28, 2017

(54) PATCH PANEL SYSTEM AND JACK MODULE ATTACHMENT THERETO

(71) Applicant: TE CONNECTIVITY AMP ESPANA, Montecada i Reixac, Barcelona (ES)

(72) Inventor: Antonio Carreras Garcia, Barcelona (ES)

(73) Assignee: COMMSCOPE CONNECTIVITY SPAIN, S.L. (ES)

( * ) Notice: Subject to any disclaimer, the term of this patent is extended or adjusted under 35 U.S.C. 154(b) by 0 days.

(21) Appl. No.: 14/888,253

(22) PCT Filed: Apr. 25, 2014

(86) PCT No.: PCT/ES2014/070368
§ 371 (c)(1),
(2) Date: Oct. 30, 2015

(87) PCT Pub. No.: WO2014/177743
PCT Pub. Date: Nov. 6, 2014

(65) Prior Publication Data
US 2016/0080836 A1    Mar. 17, 2016

Related U.S. Application Data

(60) Provisional application No. 61/817,546, filed on Apr. 30, 2013.

(51) Int. Cl.
*H01R 4/24* (2006.01)
*H04Q 1/02* (2006.01)
(Continued)

(52) U.S. Cl.
CPC ............. *H04Q 1/13* (2013.01); *H01R 13/465* (2013.01); *H01R 24/62* (2013.01); *H01R 25/00* (2013.01); *H01R 2107/00* (2013.01)

(58) Field of Classification Search
CPC ...... H01R 25/00; H01R 107/00; H01R 24/62; H01R 13/465; H04Q 1/13
(Continued)

(56) References Cited

U.S. PATENT DOCUMENTS 5,044,987 A    9/1991   Tihanyi
6,135,796 A    10/2000  Wilson et al.
(Continued)

FOREIGN PATENT DOCUMENTS

EP    1 478 056        11/2004
EP    1 570 557 B1     7/2008
(Continued)

OTHER PUBLICATIONS

International Search Report and Written Opinion for International Application No. PCT/ES2014/070368 dated Nov. 26, 2014 (17 pages).
(Continued)

*Primary Examiner* — Abdullah Riyami
*Assistant Examiner* — Nelson R Burgos-Guntin
(74) *Attorney, Agent, or Firm* — Merchant & Gould P.C.

(57) ABSTRACT

A jack module includes a chassis, a frame, and jacks. The jack module is configured to releasably hold any of a plurality of types of jacks. Each jack is configured to releasably mount to the frame. The frame is configured to couple to the chassis so that rear portions of the jacks extend rearwardly from the chassis. The jack module mounts to a rear of a patch panel frame by coupling the jack module to a faceplate mounted at a front of the patch panel frame.

27 Claims, 16 Drawing Sheets

(51) Int. Cl.
*H01R 13/46* (2006.01)
*H01R 24/62* (2011.01)
*H01R 25/00* (2006.01)
*H01R 107/00* (2006.01)

(58) Field of Classification Search
USPC .............................................. 439/638, 540.1
See application file for complete search history.

(56) References Cited

U.S. PATENT DOCUMENTS

| | | | |
|---|---|---|---|
| 6,358,091 B1 | 3/2002 | Lo et al. | |
| 6,608,764 B2* | 8/2003 | Clark | H01R 13/6658 |
| | | | 361/752 |
| 7,094,095 B1* | 8/2006 | Caveney | G02B 6/3897 |
| | | | 385/134 |
| 7,367,850 B1* | 5/2008 | Chang | H01R 13/518 |
| | | | 439/540.1 |
| 7,375,282 B2 | 5/2008 | James | |
| 7,806,721 B2* | 10/2010 | Herndon | H01R 13/518 |
| | | | 439/540.1 |
| 7,909,643 B2* | 3/2011 | Pepe | H01R 13/6658 |
| | | | 439/540.1 |
| RE43,221 E | 3/2012 | James et al. | |
| 8,241,055 B2* | 8/2012 | Chen | H01R 4/245 |
| | | | 439/404 |
| 2004/0209515 A1* | 10/2004 | Caveney | H01R 13/518 |
| | | | 439/540.1 |
| 2004/0229501 A1* | 11/2004 | Caveney | H01R 13/518 |
| | | | 439/540.1 |
| 2005/0142932 A1* | 6/2005 | Levesque | H04Q 1/066 |
| | | | 439/540.1 |
| 2005/0191901 A1* | 9/2005 | Follingstad | H01R 13/518 |
| | | | 439/534 |
| 2007/0184712 A1* | 8/2007 | Martich | H01R 13/74 |
| | | | 439/540.1 |
| 2007/0298652 A1* | 12/2007 | Clark | H04Q 1/136 |
| | | | 439/540.1 |
| 2008/0090461 A1* | 4/2008 | Pepe | H01R 13/518 |
| | | | 439/649 |
| 2008/0096438 A1* | 4/2008 | Clark | H01R 13/518 |
| | | | 439/713 |
| 2008/0124971 A1* | 5/2008 | Hoelzel | H01R 25/006 |
| | | | 439/540.1 |
| 2009/0068881 A1* | 3/2009 | Patchett | H01R 13/518 |
| | | | 439/540.1 |
| 2009/0075516 A1* | 3/2009 | Pepe | H04Q 1/136 |
| | | | 439/490 |
| 2009/0163043 A1* | 6/2009 | Demers | G02B 6/4452 |
| | | | 439/43 |
| 2010/0159742 A1* | 6/2010 | Chen | H01R 4/2416 |
| | | | 439/540.1 |
| 2011/0217867 A1* | 9/2011 | Allwood | H01R 9/2416 |
| | | | 439/488 |
| 2012/0129380 A1 | 5/2012 | Donhauser et al. | |
| 2013/0344733 A1* | 12/2013 | Mateo | H04Q 1/13 |
| | | | 439/540.1 |
| 2015/0364859 A1* | 12/2015 | Maranto | H01R 13/5812 |
| | | | 439/469 |
| 2016/0080836 A1* | 3/2016 | Carreras Garcia | H04Q 1/13 |
| | | | 439/638 |

FOREIGN PATENT DOCUMENTS

EP 1 912 301 B1 7/2009
WO WO 2011/049967 4/2011

OTHER PUBLICATIONS

Leviton; Product Specifications E2X6A0-XXX,E2X61-XXX; e2XHD 6 Port Copper Cassette Kit; 2 pages; Feb. 2012.
2. Sigma-Link System; pp. 15-20; Aug. 2011.

* cited by examiner

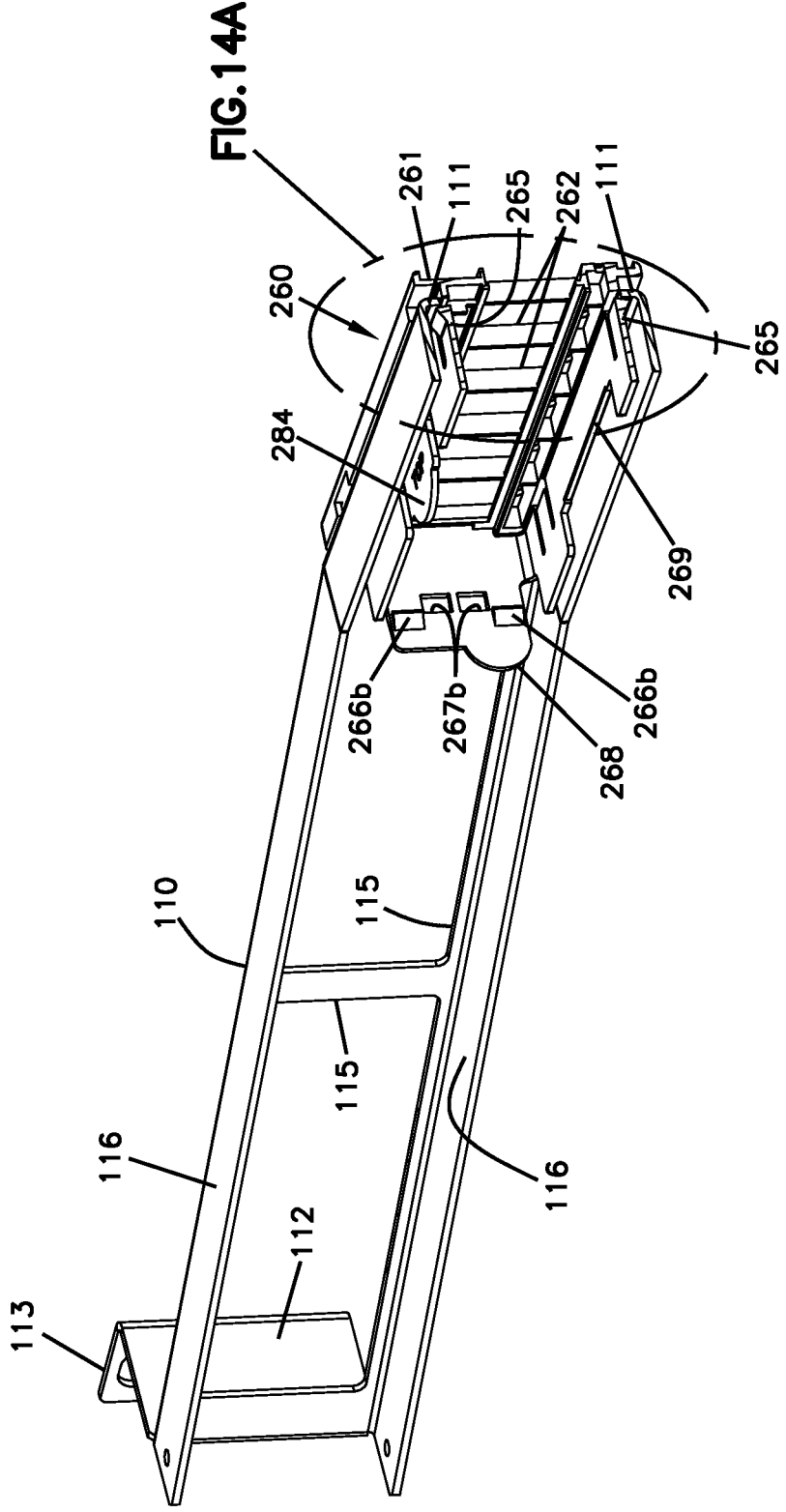

PATCH PANEL SYSTEM AND JACK MODULE ATTACHMENT THERETO

CROSS-REFERENCE TO RELATED APPLICATION(S)

This application is a National Stage of PCT/ES2014/070368, filed 25 Apr. 2014, which claims benefit of to U.S. Patent Application Ser. No. 61/817,546 filed on 30 Apr. 2013, and which applications are incorporated herein by reference. To the extent appropriate, a claim of priority is made to each of the above disclosed applications.

BACKGROUND

Patch panels are commonly used to enable inter-connection or cross-connection between telecommunications equipment. A typical patch panel includes a cable termination interface (e.g., optical adapters, electrical jacks, etc.) to connect one or more patch cables to respective connector elements. Additionally, patch panels can include fixtures to facilitate cable management and organization. Patch panels that provide more effective and/or efficient methods for cable termination and management are desired.

SUMMARY

In accordance with some aspects of the disclosure, a jack module includes a monolithically formed chassis; a frame; and jacks mounted to the frame. The monolithically formed chassis defines an interior extending from a front end of the chassis to a rear end of the chassis. The front end of the chassis defines apertures. The frame defines apertures sized to receive the jacks. The frame is configured to fit within the interior of the chassis. The jacks have front sections extending through the apertures at the front end of the chassis and having rear sections extending outwardly from the rear end of the chassis.

In some implementations, the frame defines apertures sized to fit any of a plurality of types of jacks. For example, the frame apertures may be sized to receive any of the following types of jacks: AMP-TWIST 6S, 6AS, 7AS, SL, and AMP-TWIST 6AUTP. In other implementations, the frame apertures may be sized to fit other types of jacks and/or optical adapters.

In accordance with some aspects, the jacks can be releasable mounted (e.g., latched) to the frame. The chassis also can define jack removal slots through which a release mechanism on each jack can be accessed when the frame is mounted to the chassis. For example, the chassis can include a sidewall defining the jack removal slits aligned with latches of the jacks holding the jacks to the frame. By inserting a tool (e.g., a screwdriver) through one of the jack removal slits, the jack latch can be depressed and the jack can be released from the frame and the chassis.

Each of the chassis and the frame can be formed as a single-piece construction. For example, the frame can be stamped, cut, or etched from sheet metal, poured from liquid metal or plastic, injection molded, or otherwise monolithically formed. In an example, the frame is formed from metal and the chassis and faceplate are formed from plastic. Accordingly, the frame provides grounding to the jacks (e.g., via a grounding contact mounted to the faceplate). The chassis can be injection molded from plastic, cast, or otherwise monolithically formed from metal or plastic.

In certain implementations, one or more such jack modules can be mounted to a patch panel. Certain types of patch panels include a patch panel frame; and a faceplate that releasably secures to the patch panel frame by sliding the rear of the faceplate through one of the apertures in the patch panel frame. The jack modules can be mounted to apertures of the patch panel frame using a corresponding one of the faceplates. In an example, the faceplate also may be monolithically formed from metal or plastic.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 14 is a perspective cross-section of the example patch panel system of FIG. 13 as viewed from an opposite side of the patch panel frame;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
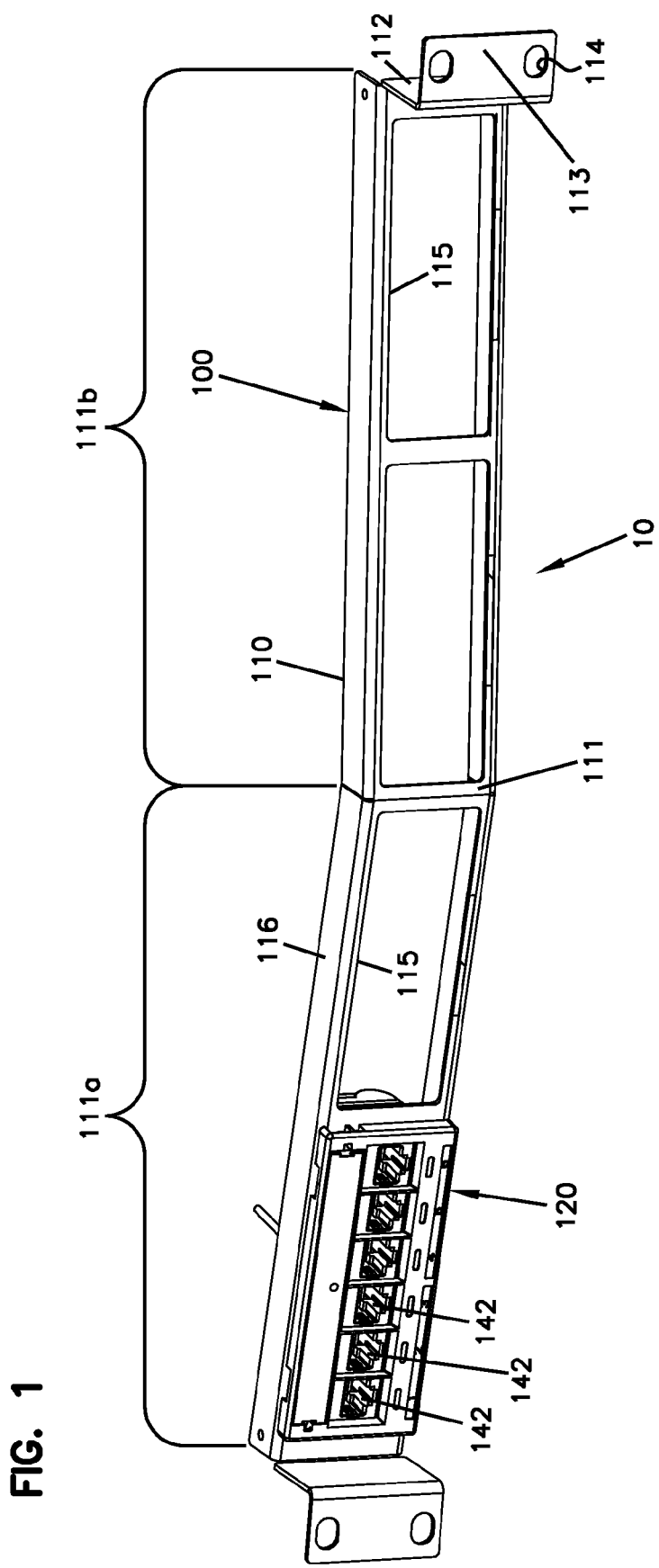
FIG. 1 is a front perspective view of an example patch panel system holding one jack module in accordance with the principles of the present disclosure.
Figure 2:
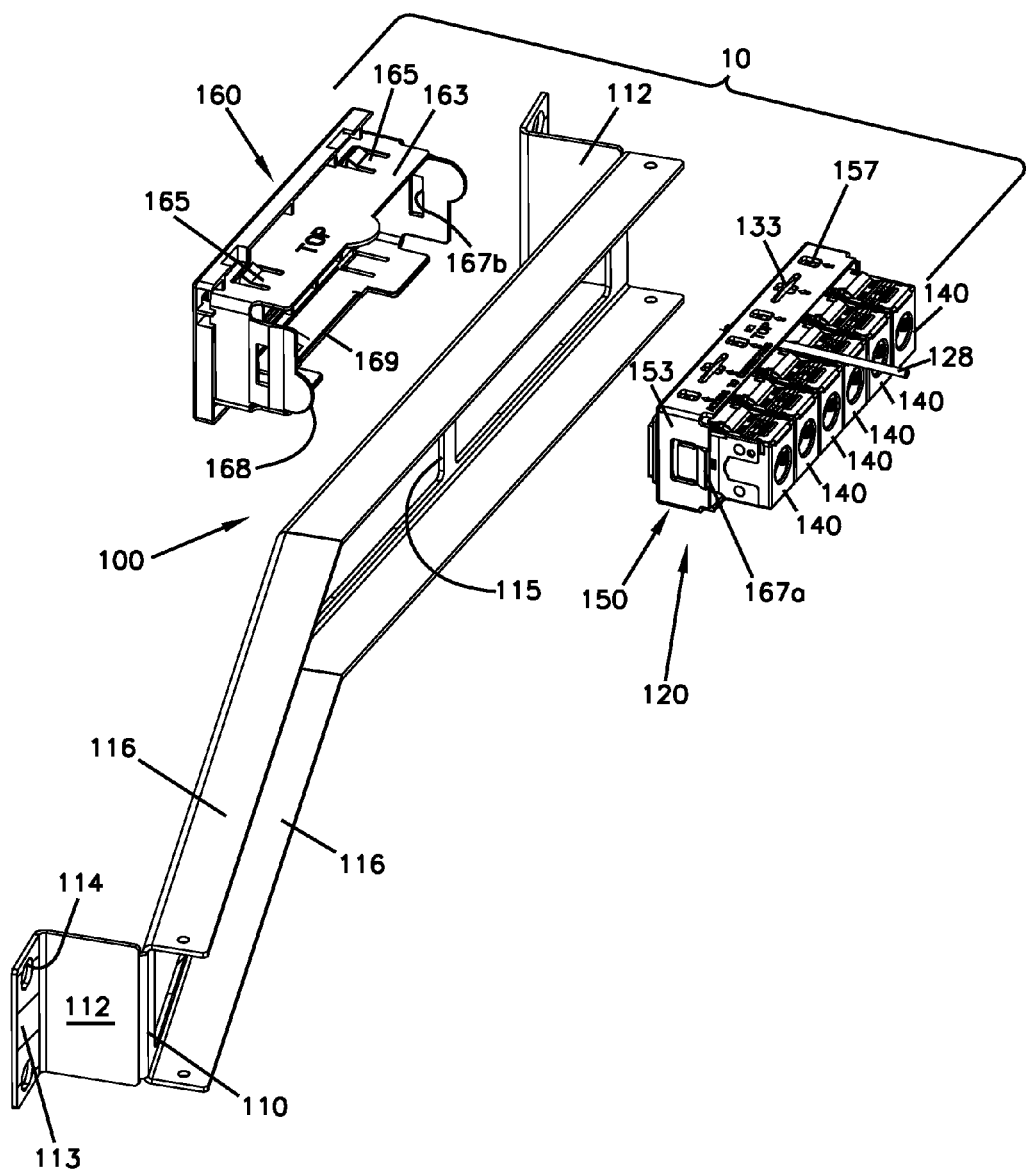
FIG. 2 is a top perspective view of a patch panel system showing a faceplate exploded forwardly of a patch panel frame and a jack module exploded rearwardly from the patch panel frame.

Referring to FIGS. 1 and 2, the present disclosure relates to a patch panel system 10 including one or more jack modules 120 configured to mount to a patch panel 100. Each jack module 120 is configured to hold one or more types of cable termination interfaces. For convenience, the cable termination interfaces disclosure herein will focus on electrical jacks 140. In other implementations, however, the jack module 120 could hold optical adapters or other media interfaces. In the example shown in FIG. 1, the patch panel 100 is configured to hold four jack modules 120. In other implementations, however, the patch panel 100 can be configured to hold a greater or lesser number of jack modules 120 (e.g., two, eight, twelve, sixteen, etc.). The patch panel 100 is configured to mount to a rack, cabinet, or other such structure.

As shown in FIG. 2, the patch panel 100 includes a patch panel frame 110 and at least one faceplate 160. In some implementations, the patch panel frame 110 is coupled to forward extensions 112 that couple to (e.g., fastened to or are monolithically formed with) mounting flanges 113 to mount the patch panel frame 110 at a position recessed from a front of the rack, cabinet, etc. In some implementations, the patch panel frame 110 defines a planar front face 111. Patch panels 100 having planar front faces 111 hold the jack modules 120 to orient the cable termination interfaces in a common direction. In other implementations, the patch panel frame 110 defines a front face 111 having a first portion 111a that is angled relative to a second portion 111b. In certain implementations, the angled portions 111a, 111b meet or intersect at an intermediate portion of the front face 111. Patch panels 100 having angled front face portions 111a, 111b hold the jack modules 120 to orient some of the cable termination interfaces away from other cable termination interfaces.

Figure 3:
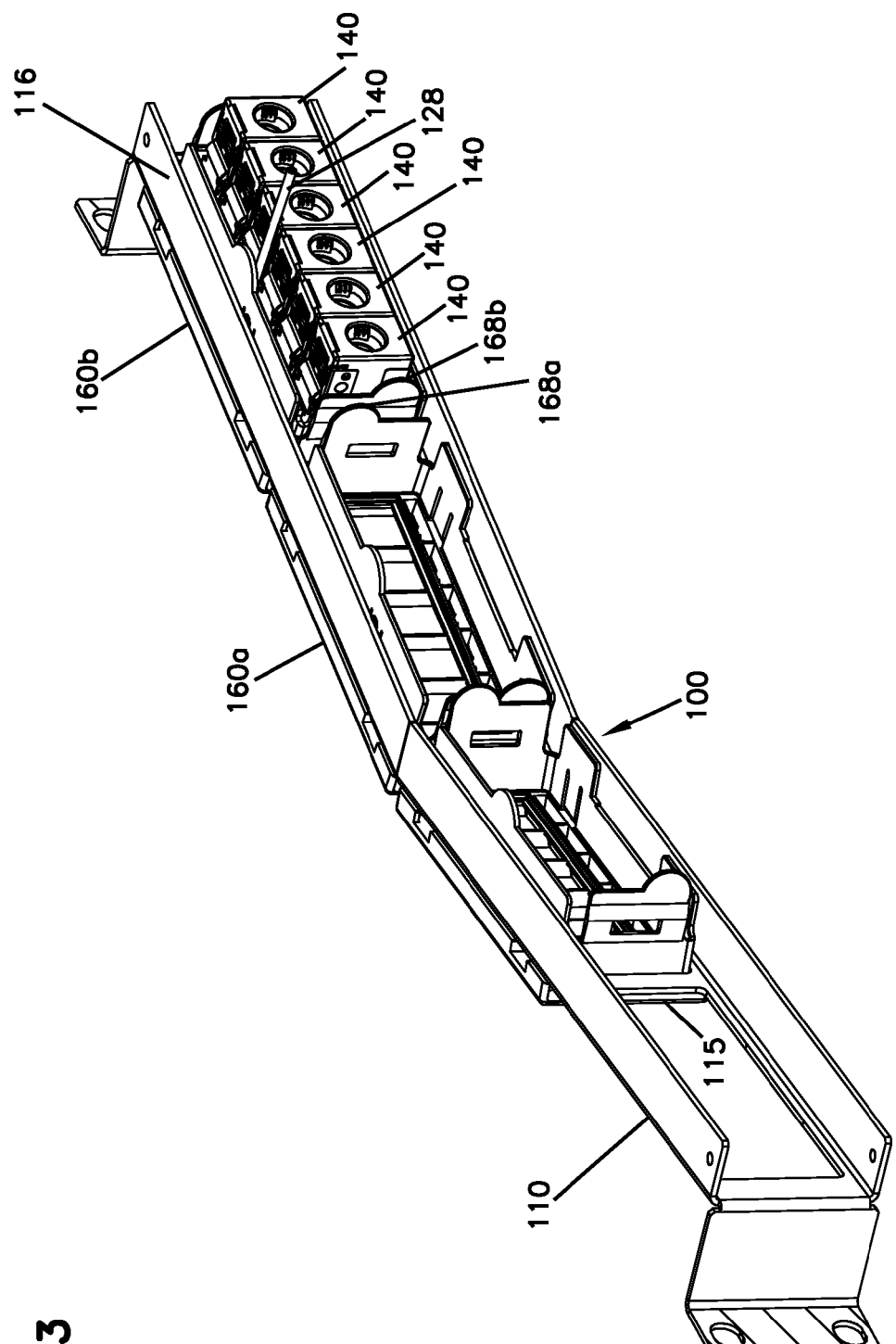
FIG. 3 is a top perspective view of a rear side of a patch panel system including a jack module and faceplate mounted to an aperture of a patch panel frame and additional faceplates mounted to the patch panel frame.

The front face 111 of the frame 110 defines one or more apertures 115 (see FIG. 1). Each aperture 115 is sized to receive one of the faceplates 160 from the front of the patch panel 100 and to receive one of the jack modules 120 from the rear of the patch panel 100 (see FIG. 2). The jack modules 120 are configured to couple to the faceplates 160 to hold the jack modules 120 to the patch panel frame 110 (see FIG. 3). For example, each jack module 120 can be latched or otherwise secured to one of the faceplates 160 (e.g., see FIG. 3).

Figure 4:
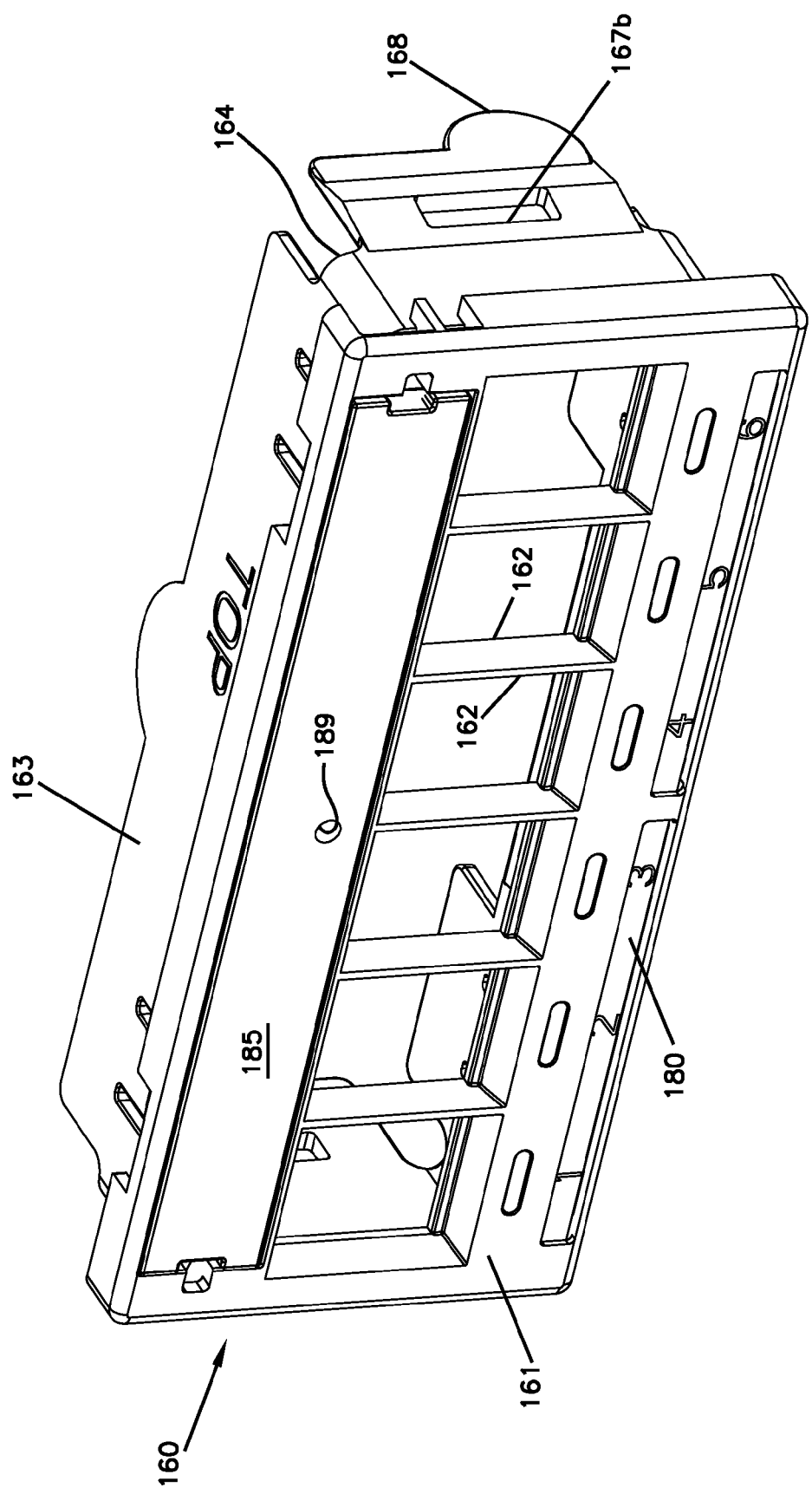
FIG. 4 is a front perspective view of an example faceplate.

FIG. 4 illustrates one example faceplate 160 suitable for use in the patch panel 100 described herein. In some implementations, the faceplate 160 can be monolithically formed from metal or plastic. The faceplate 160 includes a front panel 161 defining one or more apertures 162. Peripheral walls 163 extend rearwardly from the top, bottom, and sides of the front panel 161. In certain implementations, corners of the peripheral walls 163 define notches 164 to enable flexing/deflection of each peripheral wall 163 relative to the other peripheral walls 163. Accordingly, the jack module 120 can be inserted into the faceplate 160 from the rear of the faceplate 160 by flexing the peripheral walls 163 of the faceplate 160 over the periphery of the jack module 120 as will be described in more detail herein. The apertures 162 are sized to receive front ends of the jacks 140 when the jack module 120 is mounted within the faceplate 160.

The peripheral walls 163 are configured to hold the jack module 120 within the faceplate 160. In some implementations, the peripheral walls 163 define one or more openings 167b in which a tab, shoulder, latch, or other raised portions 167a (FIG. 2) may seat to latch the jack module 120 within the faceplate 160. In an example, each side peripheral wall 163 of the faceplate 160 defines a single opening 167b (see FIG. 4). In another example, each side peripheral wall 163 of the faceplate 160 defines dual openings 167b (see FIG. 4). In certain implementations, the faceplate peripheral walls 163 also can include ramps 166b that cooperate with ramps 166a on the outer peripheral walls 153 of the jack module 120 (FIG. 7) to facilitate outward deflection of the faceplate peripheral walls 163 and/or inward deflection of the jack module peripheral walls 153.

In some implementations, the faceplate 160 includes port indicia 180 that provides numbering or other labels to identify the various patch panel ports (e.g., apertures 115 from which the jack sockets 142 are accessible). In the example shown, numbers are engraved or molded at a recessed section at the front panel 161 of the faceplate 160. In other implementations, the port identification 180 can be applied to the faceplate 160 as a sticker, printed on the faceplate 160, or otherwise coupled to the faceplate 160. In some implementations, the faceplate 160 also includes identification 185 for the jack module 120 held by the faceplate 160. For example, the identification 185 can include a transparent label holder that mounts over a recessed portion of the front panel 161 to hold a label therebetween. In certain implementations, the faceplate 160 also can accommodate a tracer light 128 to indicate the jack module 120 held thereat. For example, the faceplate 160 can define an aperture 189 through which light may be shown as will be described in more detail herein.

In some implementations, tabs 168 extend rearwardly from one or more of the peripheral walls 163. In certain implementations, the tabs 168 extend rearwardly from the side peripheral walls 163. The tabs 168 facilitate gripping by the user of the jack module 120 to facilitate positioning the jack module 120 at the patch panel 100. The tabs 168 are configured to extend rearwardly to provide the gripping surface for the user. In some implementations, the tabs 168 are laterally aligned. In other implementations, the tabs 168 are offset from each other. For example, one tab 168 may extend from a top of one side peripheral wall 163 and the other tab 168 may extend from a bottom of the other side peripheral wall 163 (see FIG. 2). Offset tabs 168 may reduce interference between adjacent jack modules 120 at a patch panel 100 (see FIG. 3).

Figure 5:
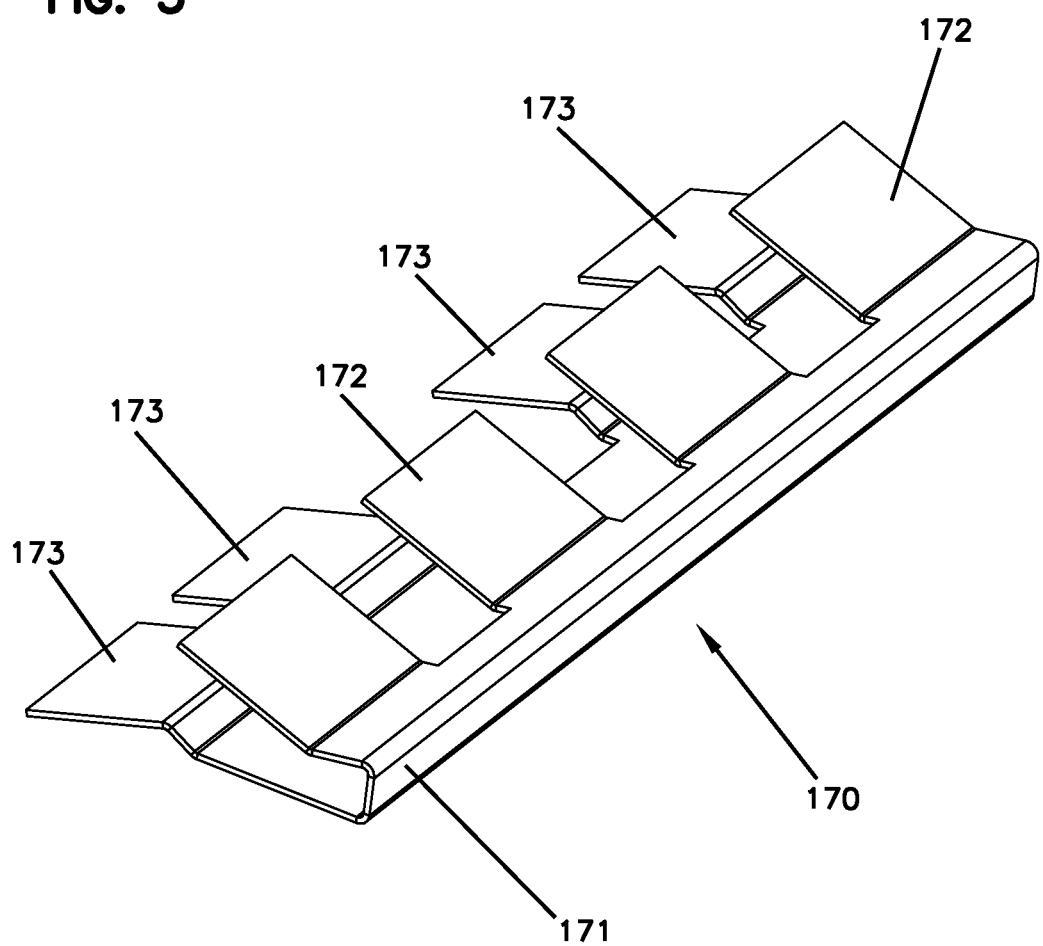
FIG. 5 is a perspective view of an example grounding clip suitable for use with any of the faceplates disclosed herein.

FIG. 5 illustrates an example grounding clip 170 that is suitable for use with a faceplate 160. The grounding clip 170 includes a clip body 171 having first contact tabs 172 and second contact tabs 173. In some implementations, the grounding clip 170 is mounted to the faceplate 160 at a cutout region 169. In an example, the cutout region 169 is located in the bottom peripheral wall 163 (FIG. 2). The clip body 171 is folded or bent over to wrap around a rear edge of the cutout region 169 (e.g., see FIG. 13). The first tabs 172 extend into the interior of the faceplate 160 and the second tabs 173 are disposed outside of the faceplate 160. The first tabs 172 are positioned to contact a ground of the jack module 120 when the jack module 120 is mounted to the patch panel 100 as will be described in more detail herein.

Figure 6:
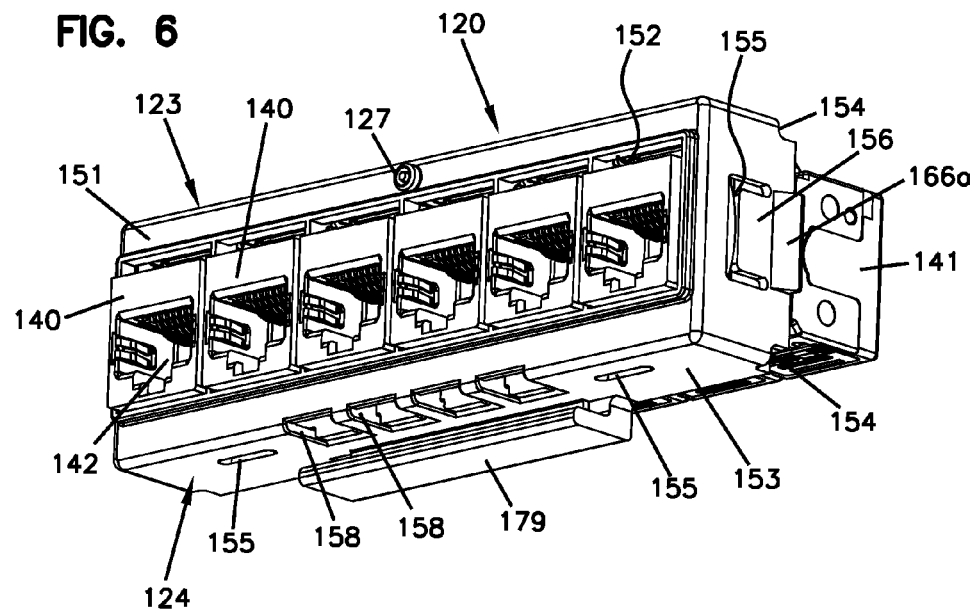
FIG. 6 is a front perspective view of the example jack module of FIG. 2.
Figure 7:
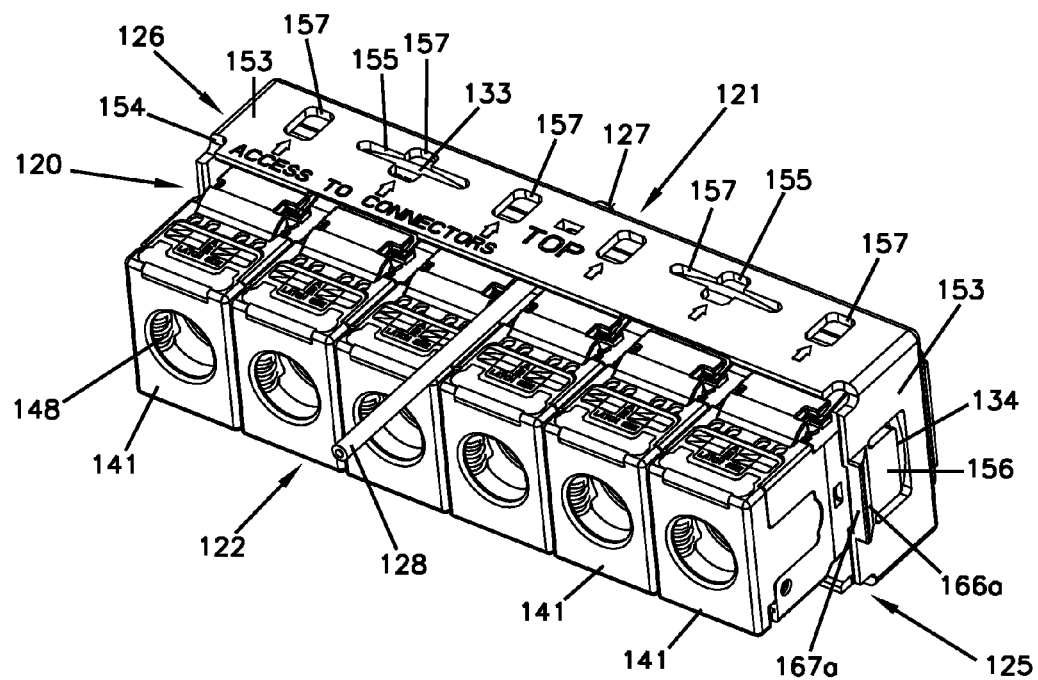
FIG. 7 is a rear perspective view of the example jack module of FIG. 2.

FIGS. 6 and 7 illustrate one example jack module 120. The jack module 120 includes a chassis 150, a frame 130, and one or more jacks 140. The jacks 140 can be individually mounted to the frame 130 (see FIG. 10). In certain implementations, the jacks 140 are separately releasable from the frame 130. The chassis 150 is configured to hold the frame 130 (see FIG. 7). In an example, the frame 130 snap-fits or friction fits to the chassis 150. The example jack module 120 has a front 121, a rear 122, a top 123, a bottom 124, a first side 125, and a second side 126. Sockets 142 of the jacks 140 are accessible from the front 121 of the jack module 120 (see FIG. 6). Cable terminations or rear ports 148 of the jacks 140 are accessible from the rear 122 of the jack module 120 (see FIG. 7).

The chassis 150 can be formed as a single-piece construction. For example, the chassis 150 can be injected molded from plastic, cast, or otherwise monolithically formed from metal or plastic. The frame 130 can be formed as a single-piece construction. The frame 130 can be stamped, cut, or etched from sheet metal, poured from liquid metal or plastic, injection molded, or otherwise monolithically formed. In an example, the frame 130 is formed from metal and the chassis 150 and faceplate 160 are formed from plastic. Accordingly, the frame 130 provides grounding to the jacks 140 (e.g., via a grounding contact 170 (FIG. 5) mounted to the faceplate 160).

In some implementations, the jack module 120 includes a tracing indicator 127 (e.g., a lighted fiber terminated at a lens, an LED, or other light indicator, a speaker or other audible indicator, etc.) that can be actuated to identify the jack module 120 to a user. In certain implementations, the tracing indicator 127 is configured to mount at the aperture 189 of the faceplate 160 so that light from the tracing indicator 127 is visible through the faceplate 160 to indicate the jack module 120 held thereat (see FIGS. 1 and 4). For example, when service is needed at a particular jack module 120 at a particular patch panel 100, the tracing indicator 127 can be actuated (e.g., light can be sent through a tracing fiber 128) to inform the user at which jack module 120 the service is needed.

Figure 8:
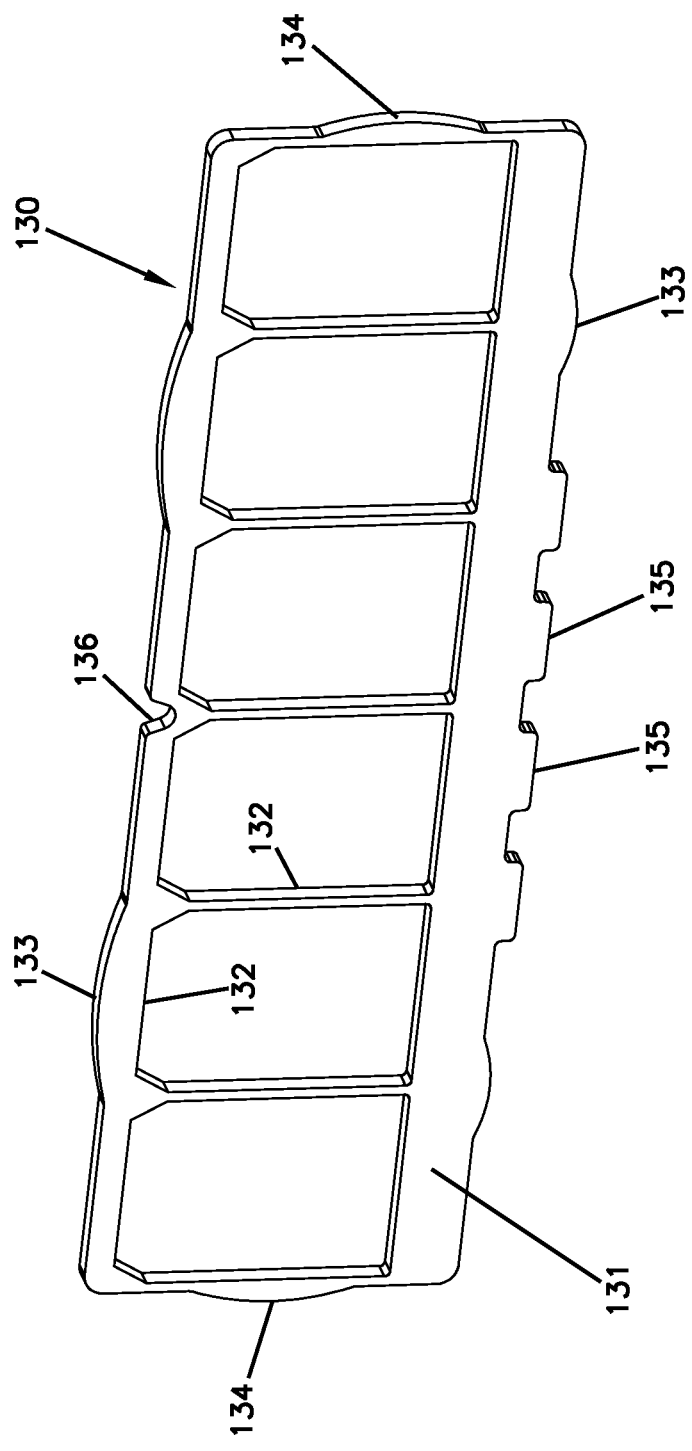
FIG. 8 is a perspective view of an example frame suitable for use in the jack modules disclosed herein.
Figure 9:
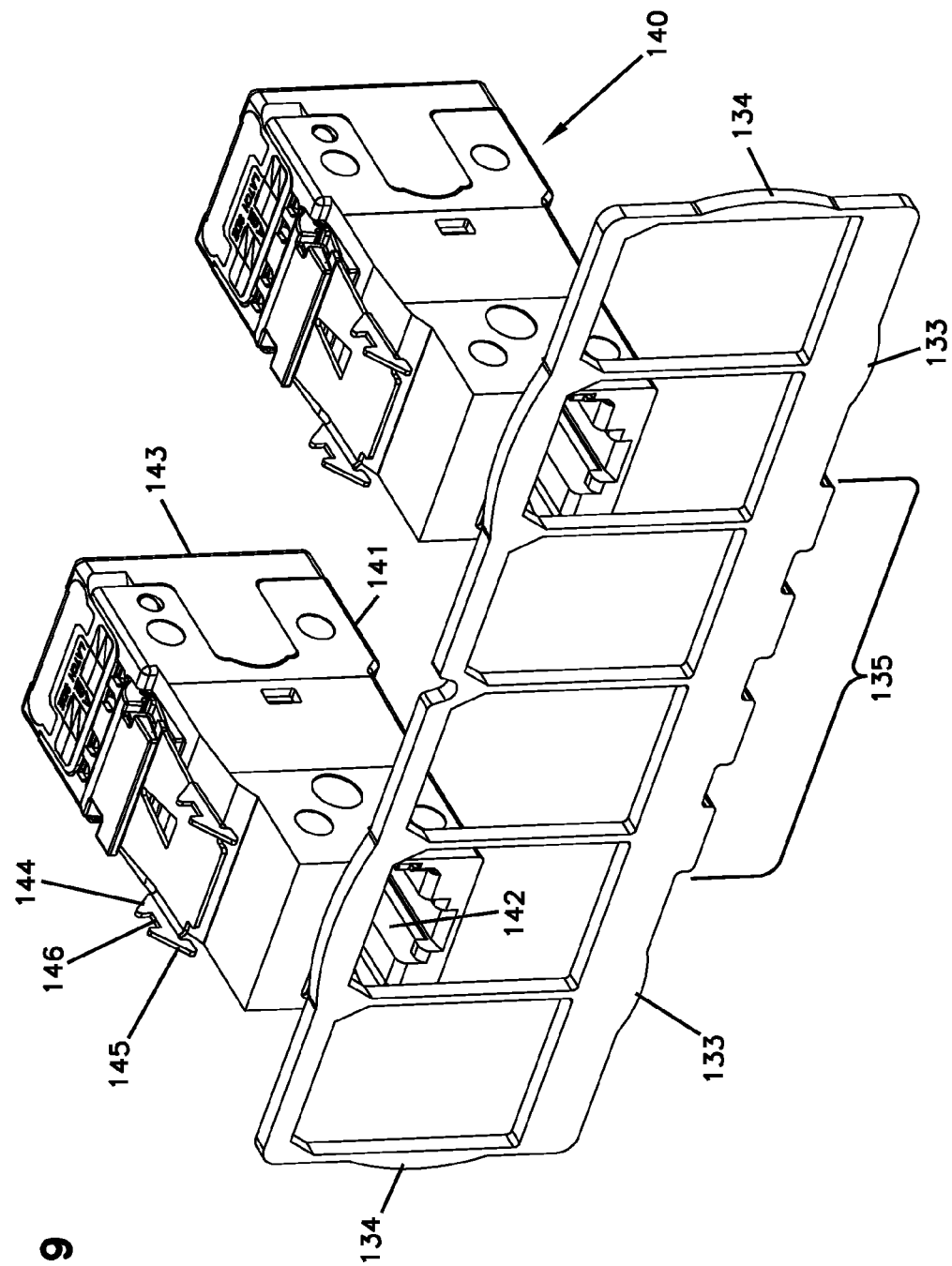
FIG. 9 illustrates two jacks exploded outwardly from the frame of FIG. 8.
Figure 10:
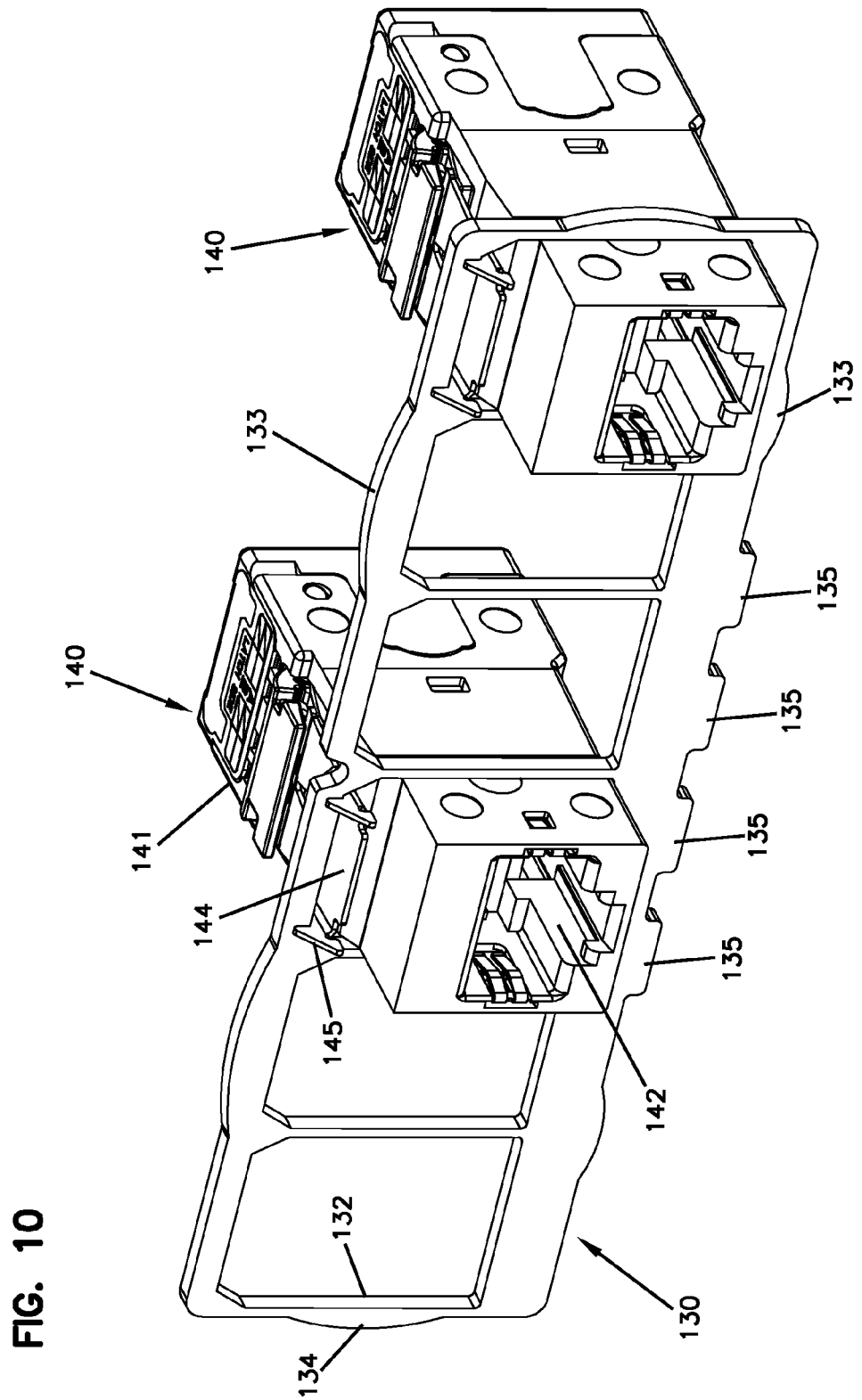
FIG. 10 illustrates the two jacks mounted to the frame of FIG. 9.

FIGS. 8-10 illustrate one example frame 130 suitable for use in the jack module 120 described herein. The frame 130 includes a body 131 defining one or more apertures 132 sized to receive electrical jacks 140. In certain implementations, the body 131 includes a planar body having circumferential edges. In some implementations, the frame apertures 132 are sized to fit any of a plurality of types of electrical jacks 140. For example, the frame apertures 132 may be sized to receive any of the following types of jacks 140: AMP-TWIST 6S, 6AS, 7AS, SL, and AMP-TWIST 6AUTP. In other implementations, the frame apertures 132 may be sized to fit other types of electrical jacks 140 and/or optical adapters.

In accordance with some aspects of the disclosure, each jack 140 can be separately mounted (e.g., latched) to the frame 130. Each jack 140 also can be separately released from the frame 130 if desired. In the example shown in FIGS. 9 and 10, each jack 140 includes a jack body 141 defining a socket 142 configured to receive a plug connector. The jack body 141 also defines a cable termination region 148 at which a cable (e.g., a twisted pair cable, a coaxial cable, etc.) can be connected to the jack body 141. In the example shown, the cable termination region 148 is located at an opposite end of the jack body 141 from the socket 142. The jack body 141 also includes a deflectable arm 144 defining a latching arrangement for maintaining the jack body 141 at the frame 130. The latching arrangement includes a ramped side 145 leading to a notch 146. Inserting the jack body 141 through one of the frame apertures 132 causes engagement between the frame body 131 and the ramped side 145 that flexes or otherwise moves the deflectable arm 144 towards the jack body 141. The deflectable arm 144 returns to its initial position when the frame body 131 clears the ramped side 145, thereby catching the frame body 131 in the notch 146 (see FIG. 10).

The frame body 131 includes locking features 133, 134 defined around an outer periphery (e.g., circumferential edge) of the frame body 131. In some implementations, the frame body 131 includes upper and lower locking features 133 as well as side locking features 134. In the example shown, a top of the frame body 131 includes two locking features 133, a bottom of the frame body 131 includes two locking features 133, and each side of the frame body 131 defines one locking feature. In other implementations, however, each side and end of the frame body 131 may have any desired number of locking features. In certain implementations, the locking features 133, 134 define curves or contours in the peripheral edge of the frame body 131. Grounding extensions 135 are disposed at a bottom edge of the frame body 131 between the two locking features 133. An accommodation notch 136 for the tracing fiber 128 is defined at a top edge of the frame body 131 between the respective two locking features 133.

Figure 11:
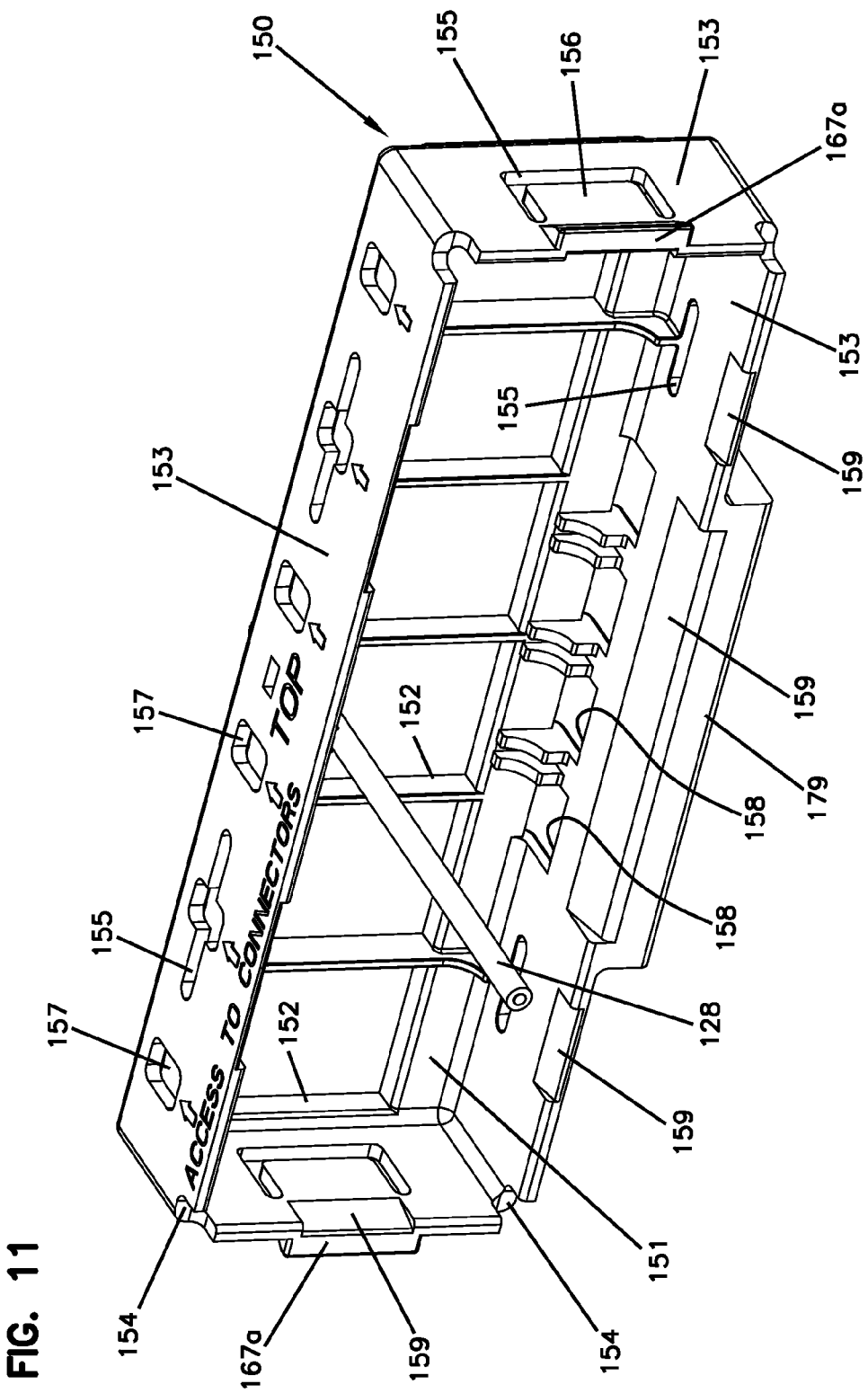
FIG. 11 is a rear perspective view of an example chassis suitable for use in the jack module of FIG. 6.

FIG. 11 illustrates one example chassis 150 suitable for use in the jack module 120 described herein. The chassis 150 includes a front face 151 (FIG. 6) defining one or more apertures 152. Peripheral walls 153 extend rearwardly from the top, bottom, and sides of the front face 151. In certain implementations, corners of the peripheral walls 153 define notches 154 to enable flexing/deflection of each peripheral wall 153 relative to the other peripheral walls 153. Accordingly, the frame 130 can be inserted into the chassis 150 from the rear of the chassis 150 by flexing the peripheral walls of the chassis 150 over the periphery of the frame 130.

The peripheral walls 153 define mating slots 155 that are sized to receive the locking features 133, 134 of the frame 130 when the frame 130 is disposed within the chassis 150. In certain implementations, two of the peripheral walls 153 also include flexible tabs 156 cutout from the rest of the wall. In the example shown, the side peripheral walls 153 include the flexible tabs 156. The tabs 156 flex outwardly when the side locking features 134 of the frame 130 slide along the side peripheral walls 153 of the chassis 150. When the side locking features 134 clear the tabs 156, the tabs 156 snap behind the side locking features 134 to hold the frame 130 in position. In an example, the side locking features 134 snap into U-shaped mating slots 155 that define the tabs 156 and the top and bottom locking features 133 snap into elongated slots 153.

One or more apertures 158 can be defined in one of the peripheral walls 153 to receive the grounding extensions 135 of the frame 130. In the example shown, the chassis 150 defines four apertures 158 at a bottom peripheral wall 153 that each receive one of the grounding extensions 135. The chassis 150 also includes a guard structure 179 that extends downwardly from the bottom peripheral wall 153 and forwardly to define a cavity or space between the guard structure 179 and the exterior of the bottom peripheral wall 153. This guard structure is configured to extend over and protect the grounding clip 170 (FIG. 5) that contacts the grounding extensions 135 on the frame 130.

In certain implementations, the peripheral walls 153 define chamfers or tapered recesses 159 that facilitate insertion of the frame 130 into the chassis 150. For example, the chamfers 159 can be located at edges of the peripheral walls 153 aligned with the mating slots 155 for receiving the frame locking features 133, 134. In certain implementations, a chamfer 159 also can be provided in alignment with apertures 158 for the grounding extensions 135. Sliding the frame 130 over the chamfers 159 facilitates outward deflection of the peripheral chassis walls 153.

The chassis 150 also can define jack removal slots 157 through which a release mechanism on each jack 140 can be separately accessed when the frame 130 is mounted to the chassis 150. For example, the top peripheral sidewall 153 of the chassis 150 can define jack removal slots 157 aligned with latch arrangements or deflectable arms 144 of the jacks 140 holding the jacks 140 to the frame 130. By inserting a tool (e.g., a screwdriver) through one of the jack removal slots 157, the jack latch arm 144 can be depressed to release the jack latch arrangement from the frame 130. When the jack latch arrangement is released, the jack 140 can be slid out of the frame 130 and the chassis 150.

In use, the jack module 120, which includes the frame 130, the jacks 140, and the chassis 150, mounts as a unit to the patch panel frame 110 using a corresponding faceplate 160 (e.g., see FIG. 2). In general, the faceplate 160 mounts to the patch panel frame 110 by sliding into one of the frame apertures 115 from a front of the patch panel frame 110. In an example, the faceplate 160 latches to the patch panel frame 110 as will be described in more detail herein.

In some implementations, at least one of the upper and lower peripheral walls 163 of the faceplate 160 include flexible latch arms 165 (FIG. 2) that are configured to deflect towards an interior of the faceplate 160. When the rear of the faceplate 160 is inserted into the patch panel frame 110, engagement between the latch arms 165 and the front face 111 of the patch panel frame 110 causes the latch arms 165 to deflect inwardly, thereby allowing the faceplate peripheral sides 163 to pass through the panel apertures 115 (e.g., see latch arms 265 of FIGS. 14 and 14A). When the latch arms 165 clear the frame front face 111, the latch arms 165 deflect back to their initial positions, thereby trapping the frame front face 111 between the faceplate latches 165 and the faceplate front panel 161.

For example, as shown in FIG. 2, the faceplate 160 mounts (e.g., latches) to the patch panel frame 110 from a front of the frame 110. The peripheral walls 163 of the faceplate 160 extend through one of the apertures 115 of the panel frame 110. The latch arms 165 snap over the inner edges of the front face 111 of the frame 110 that define the aperture 115. In certain implementations, the patch panel frame 110 also includes top and bottom flanges 116 that extend over the top and bottom peripheral surfaces 163 of the faceplate 160. In the example shown in FIG. 3, the flanges 116 extend over the latch arms 165 to inhibit removal of the jack module 120 from the panel frame 110.

The jack module 120 slides through the frame aperture 115 from a rear of the patch panel frame 110 (see FIG. 2). In particular, the chassis 150 of the jack module 120 slides into the mounted faceplate 160 from a rear of the faceplate 160 until the unit latches or otherwise secures to the faceplate 160. In an example, the chassis 150 snap-fits or friction fits to the faceplate 160. In certain implementations, the chassis/frame unit slides into the faceplate 160 so that the jack removal slots 157 of the chassis 150 are disposed beneath the peripheral sidewall 163 of the faceplate 160. In such examples, the panel flanges 116 also cover the jack removal slots 157 of the chassis 150. Accordingly, the faceplate 160 and/or panel frame 110 inhibit removal of the jacks 140 when the jack module 120 is mounted to the faceplate 160.

Figure 12:
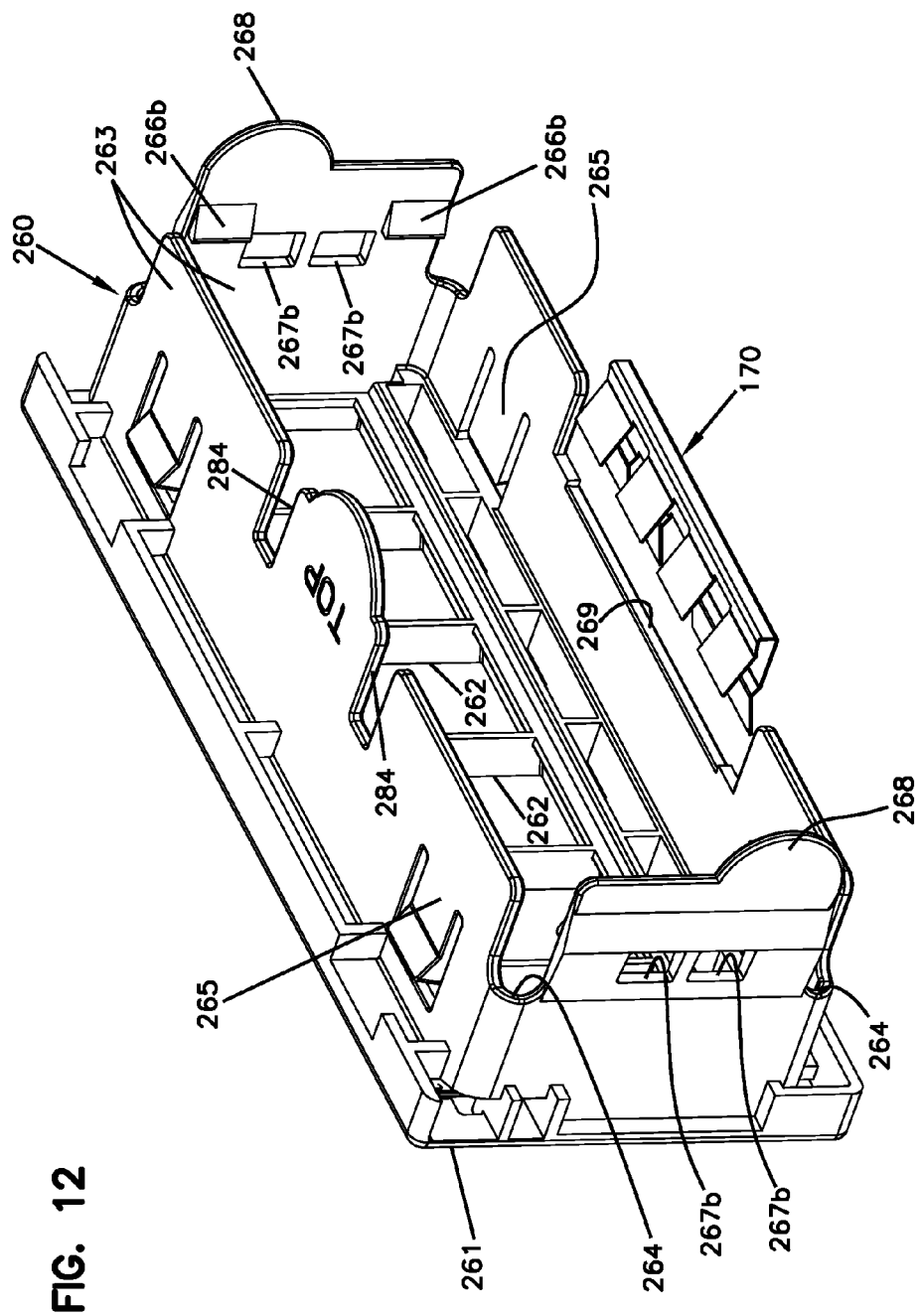
FIG. 12 is a rear perspective view of another example faceplate.
Figure 13:
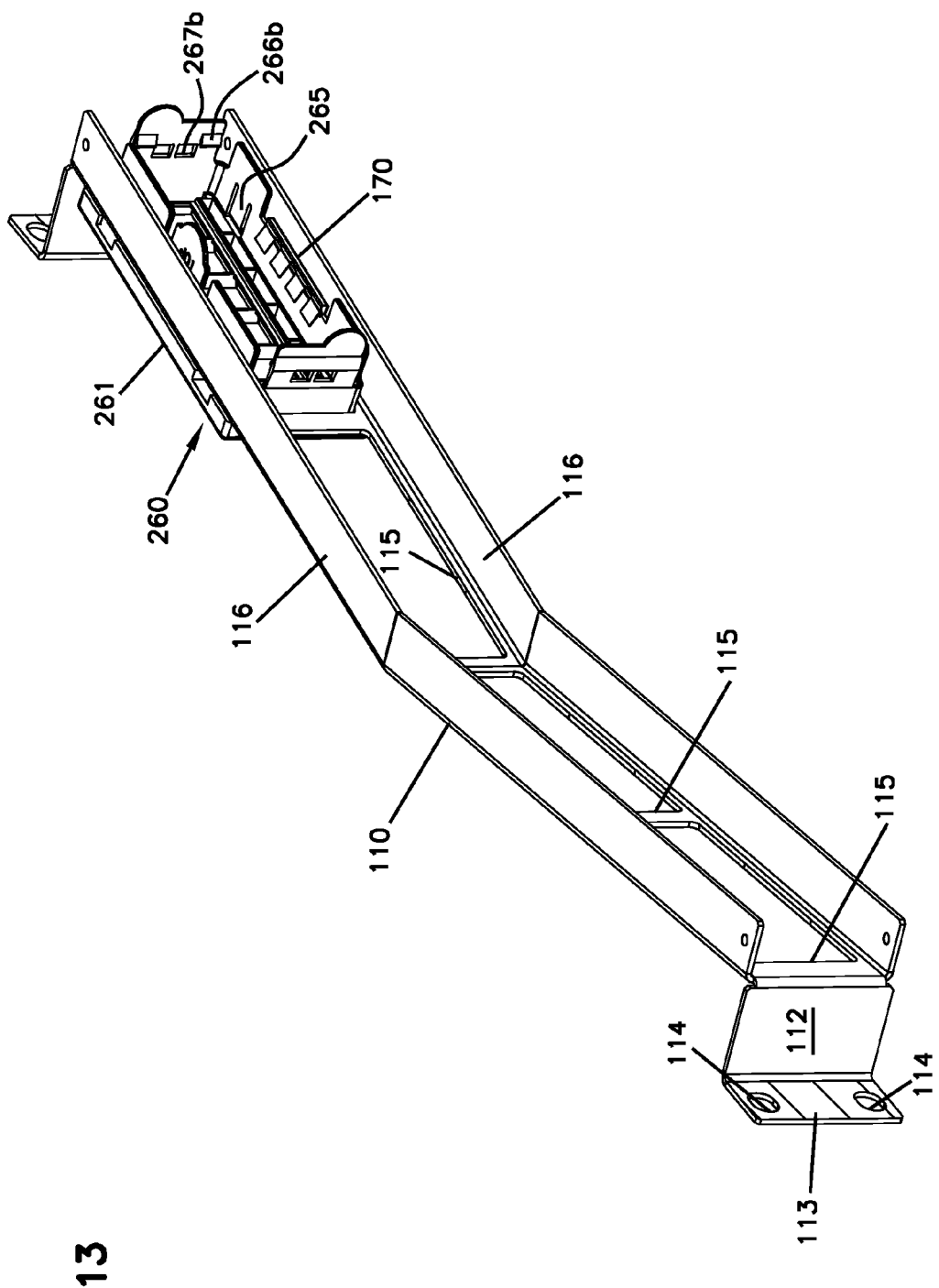
FIG. 13 is a rear perspective view of another example patch panel system including the faceplate of FIG. 12 mounted to a patch panel frame.
Figure 14A:
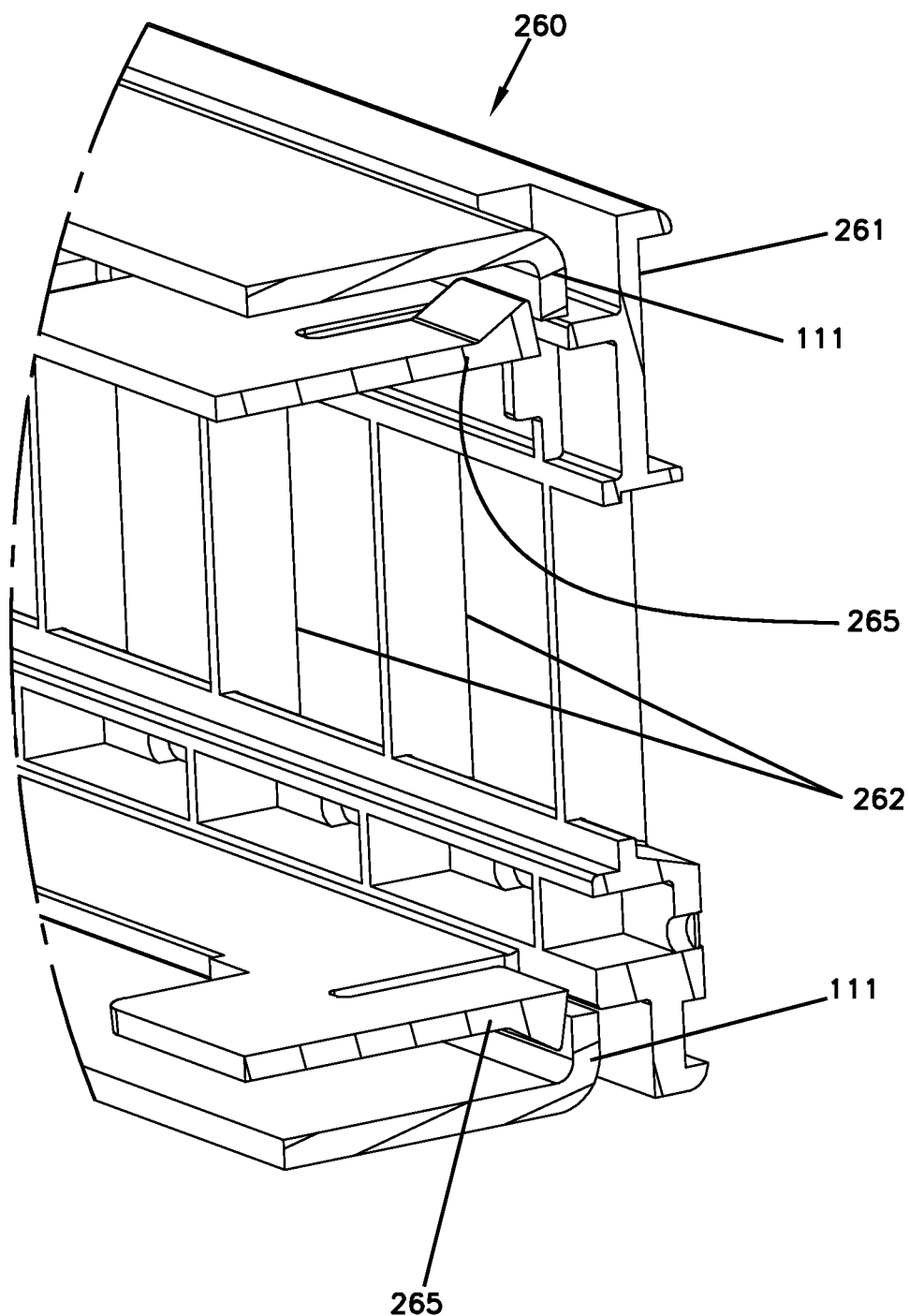
FIG. 14A is an enlarged view of a portion of FIG. 14.
Figure 15:
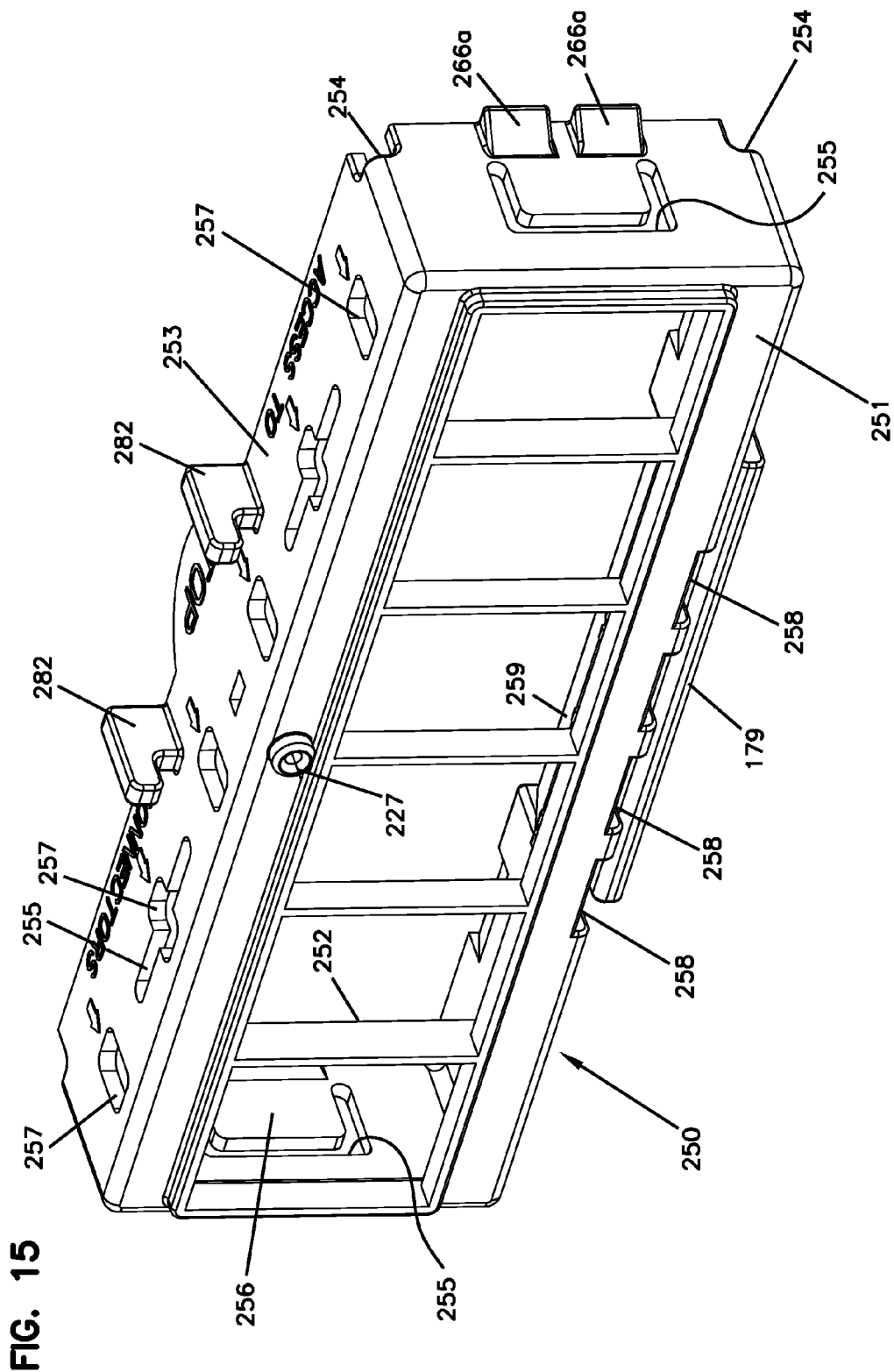
FIG. 15 is a front perspective view of another example chassis suitable for use with the frame and jacks of FIGS. 8-10.
Figure 16:
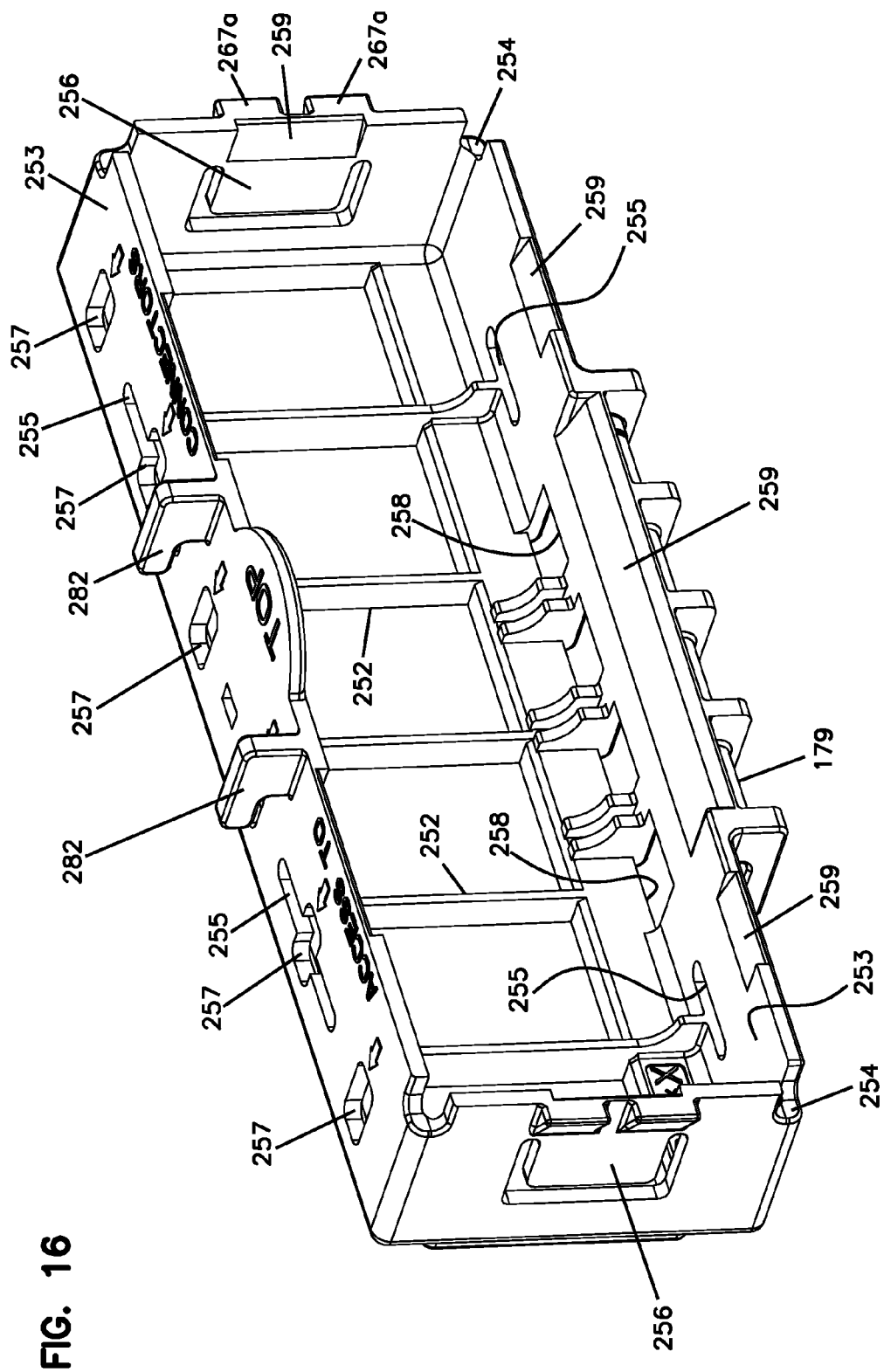
FIG. 16 is a rear perspective view of the example chassis of FIG. 15.

FIGS. 12-16 illustrate corresponding components suitable for use with alternative iterations of a jack module and faceplate suitable for mounting to a patch panel frame 110. FIGS. 12-14 illustrate another example faceplate 260 and FIGS. 15-16 illustrate another example chassis 250 configured to mount to the faceplate 260. The faceplate 260 includes a front panel 261 defining one or more apertures 262. Peripheral walls 263 extend rearwardly from the top, bottom, and sides of the front panel 261. Latch arms 265 cooperate with the front panel 261 to lock the faceplate 260 to the front face 111 of the patch panel frame 110 (e.g., see FIGS. 14 and 14A). Offset tabs 268 extend rearwardly from one or more of the peripheral walls 263. The grounding clip 170 (FIG. 5) is mounted at a cutout region 269 (FIG. 12) defined in one of the peripheral walls 263 (see FIG. 13).

Corners of the peripheral walls 263 define notches 264 to enable flexing/deflection of each peripheral wall 263 during insertion of the example chassis 250 and frame 130 from the rear of the faceplate 260. The peripheral walls 263 of the faceplate 260 define two openings 267b in which a tab, shoulder, latch, or other raised portions 267a (FIG. 16) may seat to latch the chassis 250 within the faceplate 260. The peripheral walls 263 also can include two ramps 266b that cooperate with ramps 266a (FIG. 15) located on an exterior of peripheral walls 253 of the chassis 250 to facilitate outward deflection of the faceplate peripheral walls 263 and/or inward deflection of the chassis peripheral walls 253. In addition, one of the peripheral walls 263 defines one or more slots 284 to enhance engagement between the faceplate 260 and the chassis 250.

The chassis 250 includes a front face 251 defining one or more apertures 252. Peripheral walls 253 extend rearwardly from the top, bottom, and sides of the front face 251. In certain implementations, corners of the peripheral walls 253 define notches 254 to enable flexing/deflection of each peripheral wall 253 relative to the other peripheral walls 253 to facilitate insertion of the frame 130 into the chassis 250 and/or insertion of the chassis 250 into the faceplate 260. The peripheral walls 253 define slots 255 and/or tabs 256 that are configured to receive the locking features 133, 134 of the frame 130 when the frame 130 is disposed within the chassis 250. The peripheral walls 253 define chamfers or tapered recesses 259 that facilitate insertion of the frame 130 into the chassis 250. One or more apertures 258 receive the grounding extensions 135 of the frame 130. Jack removal slots 257 enable access to a release mechanism on each jack 140.

In addition, one or more hooks 282 (FIGS. 15 and 16) extend outwardly from an exterior of one of the peripheral walls 253 of the chassis 250 to be received in the one or more slots 284 (FIG. 12) of the faceplate 260. In the example shown in FIG. 16, two hooks 282 extend upwardly and forwardly from a top peripheral wall 253 of the chassis 250 to mate with two slots 284 extending through a top peripheral wall 263 of the faceplate 260 from a rear of the faceplate 260.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:
1. A patch panel system comprising:
a faceplate having a front, a top, a bottom, and opposing sides that cooperate to define an open rear, the front defining at least a first aperture, the faceplate including first and second tabs extending rearwardly from the rear of the faceplate at the opposite sides of the faceplate, the first tab being offset from the second tab in a direction extending between the top and bottom of the faceplate; and a jack module configured to mount to the faceplate, the jack module including a chassis, a frame mounted to the chassis, and a plurality of jacks each mounted to the frame, each jack including a rear portion that extends rearwardly from the jack module and the faceplate when the jack module is mounted to the faceplate.

2. The patch panel system of claim 1, wherein each of the tabs is rounded.

3. The patch panel system of claim 1, wherein the jack module frame includes locking features around an outer periphery of the jack module frame that fit within an inner periphery of the jack module chassis.

4. The patch panel system of claim 1, wherein the jack module frame defines openings that are each sized to receive any of the following types of jacks: AMP-TWIST 6S, 6AS, 7AS, SL, and AMP-TWIST 6AUTP.

5. A patch panel system comprising:
(a) a patch panel including:
(i) a patch panel frame defining a plurality of apertures; and
(ii) a faceplate configured to fit into one of the apertures of the patch panel frame from a front of the patch panel frame; and
(b) a jack module including:
(i) a monolithically formed chassis that is configured to mount to the faceplate from a rear of the patch panel frame;
(ii) a frame configured to be disposed within the chassis, the frame defining a plurality of apertures; and
(iii) a plurality of jacks that each mount to the frame at one of the plurality of apertures, each jack having a front portion extending forwardly from the frame and being accessible from a front of the chassis and having a rear portion extending rearwardly from the frame and being accessible from a rear of the chassis.

6. The patch panel system of claim 5, wherein the chassis is configured to snap-fit to the faceplate.

7. The patch panel system of claim 5, further comprising a grounding clip coupled to the faceplate, the grounding clip being positioned to contact the jack module frame to provide grounding.

8. The patch panel system of claim 5, wherein the jack module frame is configured to hold any of the following types of jacks: AMP-TWIST 6S, 6AS, 7AS, SL, and AMP-TWIST 6AUTP.

9. The patch panel system of claim 5, wherein each aperture of the jack module frame is sized to fit any of a plurality of types of jacks.

10. The patch panel system of claim 5, wherein the plurality of jacks includes between two and sixteen jacks.

11. The patch panel system of claim 10, wherein the jack module frame is configured to hold six jacks.

12. The patch panel system of claim 5, wherein the chassis includes one tab at each of two peripheral side walls that is sized to fit in an opening defined at each of two peripheral side walls of the faceplate to mount the chassis to the faceplate.

13. The patch panel system of claim 5, wherein the chassis includes two tab at each of two peripheral side walls that are sized to fit in two openings defined at each of two peripheral side walls of the faceplate to mount the chassis to the faceplate.

14. The patch panel system of claim 5, wherein the faceplate includes a labeling region.

15. A patch panel system comprising:
(a) a patch panel including:
(i) a patch panel frame defining a plurality of apertures; and
(ii) a faceplate configured to fit into one of the apertures of the patch panel frame from a front of the patch panel frame; and
(b) a jack module including:
(i) a chassis configured to mount to the faceplate, the chassis having a front face and peripheral walls, at least one of the peripheral walls defining jack removal slots;
(ii) a frame coupled to the chassis parallel to the front face; and
(iii) a plurality of jacks mounted to the frame so that rear ends of the jacks extend rearwardly past the peripheral walls of the chassis and past peripheral walls of the faceplate; each of the jacks including a latch that is accessible through at least one of the jack removal slots;
(iv) each jack removal slot enabling separate access to a release mechanism on a respective one of the jacks when the frame is mounted to the chassis.

16. The patch panel system of claim 15, wherein the peripheral walls of the faceplate block access to the jack removal slots.

17. The patch panel system of claim 15, wherein the faceplate includes labeling indicia identifying each of the jacks.

18. The patch panel system of claim 15, further comprising a grounding clip mounted to the faceplate, the grounding clip being configured to contact the jack module frame to provide grounding to the jacks.

19. The patch panel system of claim 15, wherein the jack module frame includes locking features at peripheral locations around the frame, the locking features defining rounded sections of the jack module frame.

20. The patch panel system of claim 19, wherein the chassis defines notches at corners of the chassis peripheral walls, the notches enabling at least two of the chassis peripheral walls to flex outwardly, the two chassis peripheral walls defining recesses to receive locking features of the jack module frame.

21. The patch panel system of claim 15, wherein the jacks are aligned in a row that extends along a first direction between first and second sides of the faceplate, and wherein the faceplate includes a first tab that extend outwardly from a rear of the faceplate at the first side and a second tab that extends outwardly from the rear of the faceplate at the second side.

22. The patch panel system of claim 21, wherein the first tab is offset from the second tab in a second direction that is perpendicular to the first direction.

23. A patch panel system comprising:
(a) a patch panel including:
(i) a patch panel frame defining a plurality of apertures; and
(ii) a faceplate configured to fit into one of the apertures of the patch panel frame from a front of the patch panel frame; and
(b) a jack module including:
(i) a frame defining a plurality of apertures sized to receive jacks, the frame also having rounded locking features defined around an outer periphery of the frame; and
(ii) a chassis having a top wall, a bottom wall, a first side wall, and a second side wall, the walls of the chassis defining mating slots and chamfers around an inner periphery of the chassis, the mating slots being configured to receive the rounded locking features of the frame when the frame is mounted to the chassis, the chamfers being configured to facilitate insertion of the rounded locking features into the mating slots.

24. The patch panel system of claim 23, wherein the chassis defines notched corners that enable deflection of the walls of the chassis to accommodate receipt of the rounded locking features at the chamfers and mating slots.

25. The patch panel system of claim 23, wherein the first and second side walls of the chassis each define U-shaped mating slots that receive some of the locking features of the jack module frame.

26. The patch panel system of claim 23, wherein the top and bottom walls of the chassis each define elongated mating slots that receive some of the locking features of the jack module frame.

27. The patch panel system of claim 23, wherein the faceplate includes latching tabs that extend rearwardly, the latching tabs being configured to latch to the chassis.

\* \* \* \* \*